(12) United States Patent
Cha et al.

(10) Patent No.: US 12,707,423 B2
(45) Date of Patent: Aug. 11, 2026

(54) FALLBACK BEHAVIOR FOR SOUNDING REFERENCE SIGNAL TRANSMISSIONS

(71) Applicant: Nokia Technologies Oy, Espoo (FI)

(72) Inventors: Hyun-Su Cha, Oak Park, IL (US); Ryan Keating, Chicago, IL (US); Tao Tao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 280 days.

(21) Appl. No.: 18/710,225

(22) PCT Filed: Nov. 15, 2021

(86) PCT No.: PCT/CN2021/130657

§ 371 (c)(1),
(2) Date: May 15, 2024

(87) PCT Pub. No.: WO2023/082256

PCT Pub. Date: May 19, 2023

(65) Prior Publication Data

US 2024/0430844 A1 Dec. 26, 2024

(51) Int. Cl.
*H04W 64/00* (2009.01)
*H04L 5/00* (2006.01)

(52) U.S. Cl.
CPC .......... *H04W 64/00* (2013.01); *H04L 5/0048* (2013.01)

(58) Field of Classification Search
CPC ............................ H04W 64/00; H04L 5/0048
USPC .......................................................... 370/329
See application file for complete search history.

(56) References Cited

U.S. PATENT DOCUMENTS

2022/0201672 A1* 6/2022 Tomeba ................ H04W 16/28
2022/0361007 A1* 11/2022 Cui .................. H04W 74/0833
2023/0136011 A1* 5/2023 Ly ....................... H04B 7/0695
370/329

* cited by examiner

*Primary Examiner* — Hermon Asres
(74) *Attorney, Agent, or Firm* — Barta Jones, PLLC

(57) ABSTRACT

Embodiments of the present disclosure relate to fallback behavior for sounding reference signal (SRS) transmissions. According to embodiments of the present disclosure, a terminal device determines an activation/deactivation on the configured SRS resource in radio resource control (RRC)_ INACTIVE state and behaviours of the terminal device depend on the activation/deactivation. In this way, it improves positioning accuracy for terminal devices in RRC-INACTIVE state. Additionally, it can also improve power consumption efficiency by avoiding unnecessary power consumption of the terminal device.

20 Claims, 4 Drawing Sheets

FALLBACK BEHAVIOR FOR SOUNDING REFERENCE SIGNAL TRANSMISSIONS

FIELD

Embodiments of the present disclosure generally relate to the field of telecommunication and in particular, to methods, devices, apparatuses and computer readable storage medium for fallback behavior for sounding reference signal transmissions.

BACKGROUND

With development of communication systems, more and more technologies have been proposed. A Sounding Reference Signal (SRS) is a reference signal transmitted by user equipment (UE) in an uplink direction which is used by the base station to estimate an uplink channel quality over a wider bandwidth. The base station may use this information for uplink frequency selective scheduling. SRS gives information about combined effects of multipath fading, scattering, Doppler and power loss of transmitted signals. Additionally, positioning techniques are supported in current communication systems. For example, in new radio (NR) system, there are two types of SRS, which are separately configured to a UE by the gNB. The first SRS is for multiple input multiple output (MIMO), and another SRS is for positioning purposes, where the SRS for positioning can be used by the RRC_INACTIVE state of UEs. In the uplink-based positioning, UE may transmit one or multiple SRS resources to one or more transmission reception points (TRPs), and each TRP may measure relative time of arrival (RTOA), gNB reception and transmission time difference (gNB Rx-Tx), and/or angle of arrival (AoA), and sends the measurements to a location management function (LMF).

SUMMARY

In general, example embodiments of the present disclosure provide a solution for fallback behavior for sounding reference signal transmissions.

In a first aspect, there is provided a first device. The first device comprises at least one processor; and at least one memory including computer program codes; the at least one memory and the computer program codes are configured to, with the at least one processor, cause the first device to: receive, from a second device, a configuration of sounding reference signal (SRS) resource for positioning to be used in an inactive state of the first device; monitor at least one first reference signal associated with the configuration of SRS resource from the second device; monitor at least one second reference signal associated with the configuration of the SRS resource from the second device; and in accordance with a determination of a failure in detecting the at least one first reference signal and a success in detecting the at least one second reference signal, determine parameter(s) related to the at least one first reference signal based on the at least one second reference signal.

In a second aspect, there is provided a method. The method comprises receiving, at a first device and from a second device, a configuration of sounding reference signal (SRS) resource for positioning to be used in an inactive state of the first device; monitoring at least one first reference signal associated with the configuration of SRS resource from the second device; monitoring at least one second reference signal associated with the configuration of the SRS resource from the second device; and in accordance with a determination of a failure in detecting the at least one first reference signal and a success in detecting the at least one second reference signal, determining parameter(s) related to the at least one first reference signal based on the at least one second reference signal.

In a third aspect, there is provided an apparatus. The apparatus comprises: means for receiving, at a first device and from a second device, a configuration of sounding reference signal (SRS) resource for positioning to be used in an inactive state of the first device; means for monitoring at least one first reference signal associated with the configuration of SRS resource from the second device; means for monitoring at least one second reference signal associated with the configuration of the SRS resource from the second device; and means for in accordance with a determination of a failure in detecting the at least one first reference signal and a success in detecting the at least one second reference signal, determining parameter(s) related to the at least one first reference signal based on the at least one second reference signal.

In a fourth aspect, there is provided a computer readable medium. The computer readable medium comprises program instructions for causing an apparatus to perform at least the method according to any one of the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
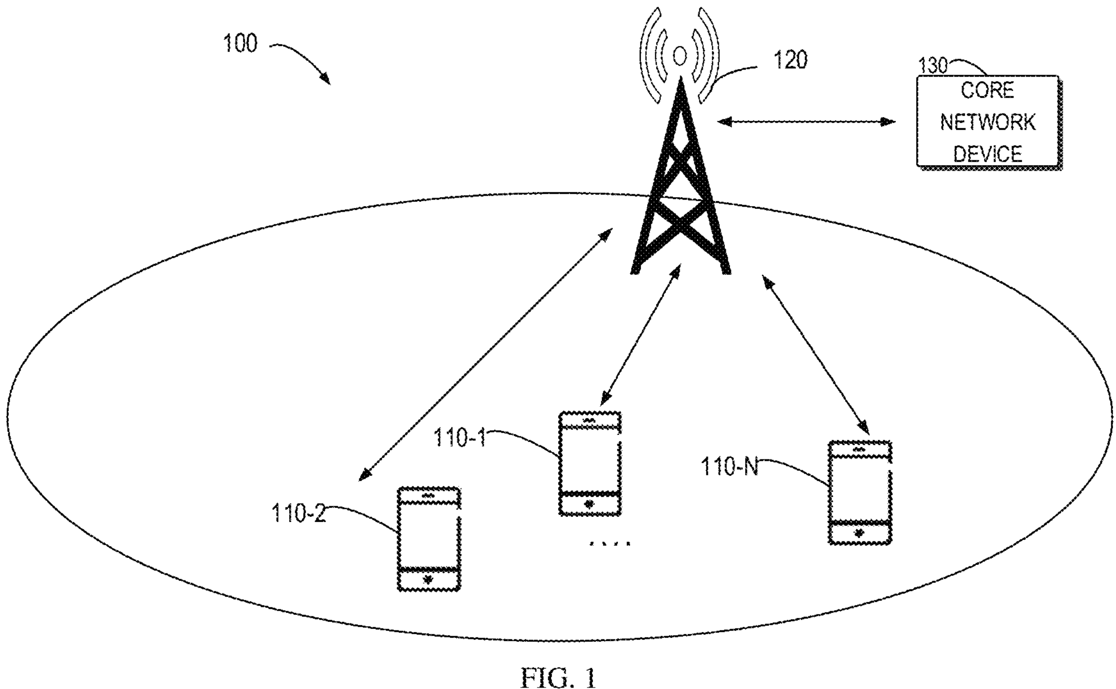
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, the gNB can be split into a centralized unit (CU) and a decentralized unit (DU). That CU hosts the higher layers of the protocol stack including the radio resource control (RRC) and packet data convergence protocol (PDCP) while the DU hosts the lower layers such as the physical layer, medium access control (MAC) layer and radio link control (RLC) layer.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, positioning techniques are supported in current communication systems. For example, the following positioning techniques are proposed: downlink time difference of arrival (DL-TDOA), uplink time difference of arrival (UL-TDOA), downlink angle of departure (DL-AoD), uplink angle of arrival (UL-AoA), and multi-cell round trip time (Multi-RTT). The positioning support for UEs in radio resource control inactive (RRC_INACTIVE) state has been being discussed. For DL positioning reference signal (PRS) measurement, it has been agreed to support PRS-reference signal received power (RSRP) and reference signal time difference (RSTD) measurement of the UEs in RRC_INACTIVE state. Additionally, it is possible to support UL and UL+DL positioning for UEs in RRC_INACTIVE state by allowing SRS transmission of the UE in RRC_INACTIVE state.

In addition, the positioning may support UL and UL+DL positioning for RRC_INACTIVE state of UEs by at least periodic SRS and PRS. The UEs in the RRC_INACTIVE state may not receive an updated, configuration and/or reconfiguration of signalling of SRS configuration after every transmission, so it might be hard to expect that the configured SRS parameters would be appropriately updated to the UE in time.

According to conventional technologies, SRS resources for positioning may be configured so that the UE can appropriately transmit the SRS toward neighbour cells and/or TRPs. For this purpose, a path-loss reference signal (RS) can be a specific synchronization signal/physical broadcast block (SSB) or a PRS resource transmitted from neighbour cells in order for UE to determine necessary transmission power to transmit the SRS resources to the target neighbour cells. The determined transmission power may be used, by the UE, to transmit the SRS. Also, spatial relation RS for a SRS resource can be configured as a PRS resource or SSB transmitted from a neighbour cells and it helps to decide a transmission beam to transmit SRS resource toward the neighbour cells. It should be noted that the path-loss reference RS may or may not be per SRS resource set configurable while the spatial relation RS is per SRS resource configurable by the base station.

According to the specified UE behaviour of positioning, which is for RRC_CONNECTED state of UEs, if the UE determines that the UE is not able to accurately measure the pre-configured path-loss RS, the UE calculates path-loss using a RS resource obtained from the synchronization signal/physical broadcast channel (SS/PBCH) block of the serving cell. It has been discussed whether or not to reuse this UE behaviour, which is to determine the path-loss reference RS, as the validity criterion and fallback UE behaviour. It means that the path-loss detection criteria may be used as a criterion on SRS validity decision and the UE will use serving cell SSB as a path-loss reference RS for transmission of the SRS even if the UE decides the pre-configured path-loss RS for the SRS is invalid.

However, following the conventional behaviour may not be a good way. The UE may have a negative impact on the network as the SRS could be interference. Even if the UE fails to detect either or both of the path-loss RS and spatial relation RS, if the UE still transmits the SRS, the transmitted SRS might not be negligible interference signals to a neighbour cells/TRPs close to the UE.

The support of UL and UL+DL positioning using SRS for positioning is a new feature for NR. It should consider two possibilities such that the UE fails to detect the configured path-loss RS transmitted from the neighbour cells and/or fails to detect the configured spatial relation RS for an SRS resource. Considering the two possibilities and the network performance, a sophisticated design of the validity decision criterion and UE behaviour in the RRC_INACTIVE state is necessary. Technical features to support RRC_INACTIVE positioning have been proposed.

For example, if the serving cell moves to a location outside of predefined group of cells, the UE determines the SRS is invalid. This method may be limited to use in practice since the UE needs at least rough location and it is questionable how to determine the predetermined group of cells for each UE so that the configured SRS is valid.

In some conventional technologies, they consider that validity timer may be an option for the configured SRS, but the UE mobility and/or location may be highly related to the valid time. The network may have trouble to predict/assume the UE mobility behaviour for timer configuration. Some conventional technologies have suggested considering timing advance (TA) for validity of SRS. If the TA is not suitable for SRS transmission, even if the UE knows the necessary transmission power and/or transmission beam direction to target gNB(s)/TRP(s), the gNB(s)/TRP(s) may not properly receive it. However, even if the TA is correct, if the UE does not properly determine the transmission power and beam, the gNB(s)/TRP(s) may not also properly receive it.

Further, some technologies suggest reusing the Rel-16 UE behavior in case the UE could not detect the path-loss RS. Also it suggests reusing criteria of accurately path-loss RS measurement for the spatial relation RS; if the UE determines that the UE is not able to accurately measure the pre-configured spatial relation RS, the spatial relation RS will not be valid. It discusses the UE fallback behaviour if the UE fails to detect path-loss RS such as entering RRC_CONNECTED state to perform UL positioning or request/update the SRS configuration; or remaining in RRC_INACTIVE state to perform UL positioning and request/update SRS configuration. However, the conventional technologies do not consider the possibility such that the UE can detect spatial relation RS even if it fails to detect path-loss RS.

In order to solve at least part of the above and other potential problems, a new solution is proposed for selecting reference signal resources for path-loss reference signals and/or spatial relation reference signals and to define fallback behavior for sounding reference signal transmissions. According to embodiments of the present disclosure, a terminal device determines an activation/deactivation on the configured SRS resource in RRC_INACTIVE state and behaviours of the terminal device depend on the activation/deactivation. In this way, it improves positioning accuracy for terminal devices in RRC-INACTIVE state. Additionally, it can also improve power consumption efficiency by avoiding unnecessary power consumption of the terminal device.

FIG. 1 illustrates a schematic diagram of a communication environment 100 in which embodiments of the present disclosure can be implemented. The communication environment 100, which is a part of a communication network, comprises a device 110-1, a device 110-2, . . . , a device 110-N, which can be collectively referred to as "first device(s) 110." The communication environment 100 further comprises a second device 120 that can communicate with the first device(s) 110. The communication environment 100 may also comprise a core network device 130, for example, a Location Management Function (LMF). The first device may be served by a physical cell. In some embodiments, there can be one or more transmission reception points (TRPs) in the physical cell.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable.

It is to be understood that the number of first devices and cells and their connections shown in FIG. 1 is given for the purpose of illustration without suggesting any limitations. The environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
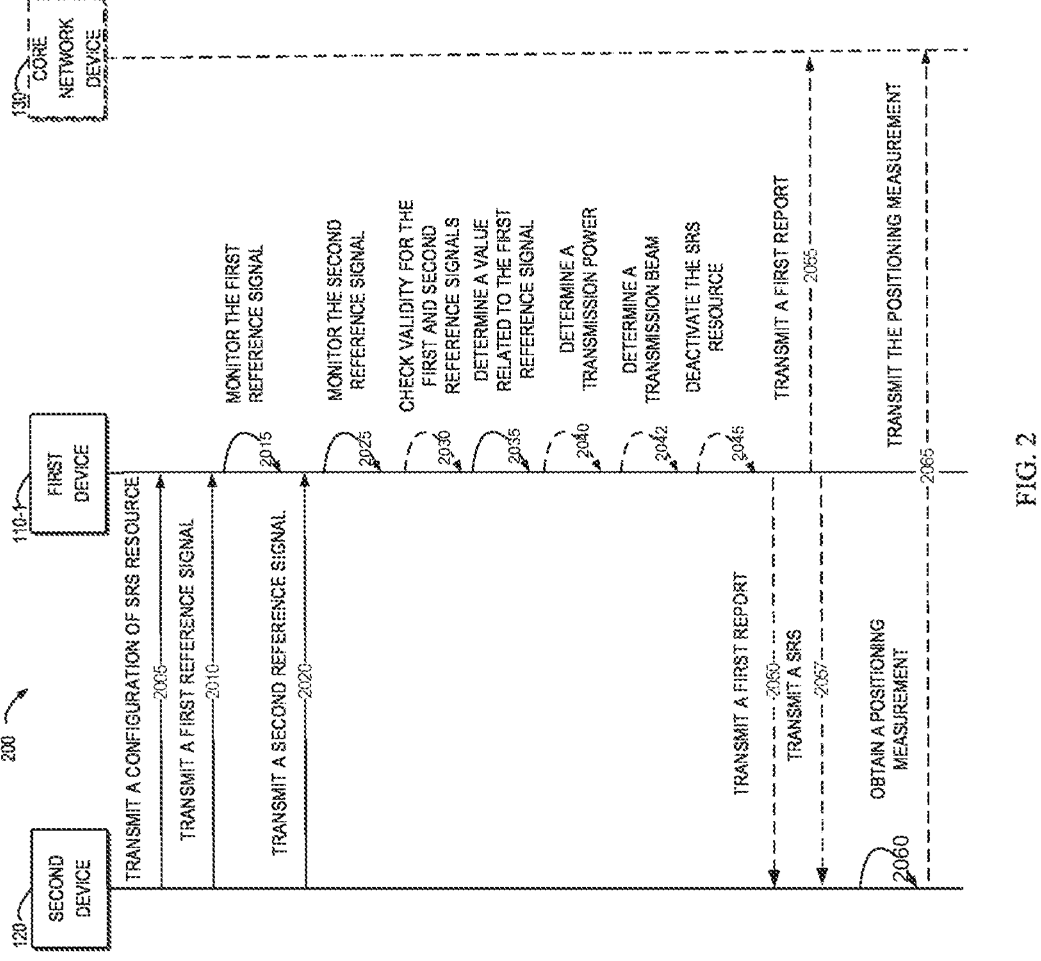
FIG. 2 illustrates a signaling flow for fallback behavior for sounding reference signal transmissions according to some example embodiments of the present disclosure.

Example embodiments of the present disclosure will be described in detail below with reference to the accompanying drawings. Reference is now made to FIG. 2, which illustrates a signaling flow 200 for selecting resources for determining a path-loss reference signal and a spatial relation reference signal using the first and the second reference signals according to example embodiments of the present disclosure. For the purpose of discussion, the signaling flow 200 will be described with reference to FIG. 1. The signaling flow 200 may involve the first device 110-1 and the second device 120.

The second device 120 transmits 2005 a configuration of SRS resource. In some embodiments, the configuration of SRS resource can be transmitted via RRC signaling. For example, the configuration of SRS resource may be transmitted in RRC Release configuration. In some embodiments, the configuration of SRS resource can comprise a number of physical resource blocks and/or transmission periodicity which are allocated for the SRS. Alternatively or in addition, the configuration of SRS resource can comprise a bandwidth parameter of SRS. In some embodiments, the configuration of SRS resource may indicate one or more SRS resources. Alternatively or in addition, the configuration of SRS resource may indicate one or more SRS resource sets. The first device 110-1 is to use the configuration of SRS resource for positioning when the first device 110-1 is in an inactive state. In some embodiments, the inactive state can be a RRC_INACTIVE state. Alternatively, the inactive state can be RRC_IDLE state. It should be noted that the inactive state can refer to any state where the first device 110-1 is not in the RRC_ACTIVE state.

The second device 120 transmits 2010 a first reference signal to the first device 110-1. The first device 110-1 monitors 2015 the first reference signal. The second device 120 transmits 2020 a second reference signal to the first device 110-1. The first device 110-1 monitors 2025 the second reference signal. It should be noted that an order of the transmission of the first reference signal and the transmission of the second reference signal shown in FIG. 2 is only an example not limitation. In other words, the transmission of the first reference signal may be before or after the transmission of the second reference signal. In some embodiments, the first device 110-1 may monitor the first and/or second reference signal periodically. Alternatively, the first device 110-1 may keep monitoring the first and/or second reference signal.

In some example embodiments, the first reference signal may be a path-loss reference signal and the second reference signal may be a spatial relation reference signal. Alternatively, the first reference signal may be a spatial relation reference signal and the second reference signal may be a path-loss reference signal. It should be noted that the first reference signal and the second reference signal can be any proper two different types of reference signals. The term "path-loss reference signal" can refer to a reference signal where the terminal device can determine a transmission power based on path-loss measurement measured from the reference signal. The term "spatial relation reference signal" can refer to a reference signal where the terminal device can determine a transmission beam to transmit SRS resource based on the reference signal.

In an example embodiment, the path-loss reference signal can be a SSB including a physical cell identity, for each SRS resource set. Alternatively, the path-loss reference signal can be a PRS resource including a physical cell identity and a transmission reception point (TRP) identity, for each SRS resource set.

In other embodiments, the spatial relation reference signal can be a SSB including a physical cell identity, for each SRS resource. Alternatively, the spatial relation reference signal can be a PRS resource including a physical cell identity and a TRP identity, for each SRS resource.

The first device 110-1 may check 2030 validity for the first reference signal and the second reference signal. In some embodiments, for a configured SRS resource or a configured SRS resource set, if the first device 110-1 properly detects either the first reference signal or the second reference signal, the first device 110-1 may determine that this configured SRS resource or configured SRS resource set is valid and the first device 110-1 does not deactivate it. In some cases, if the configured SRS resource or SRS resource set was deactivated, the first device 110-1 may activate this configured SRS resource.

If the first device 110-1 fails to detect the first reference signal and successfully detect the second reference signal, the first device 110-1 determines 2035 a parameter related to the first reference signal based on the second reference signal. Alternatively, if the first device 110-1 successfully detects the first reference signal and fails to detect the second reference signal, the first device 110-1 can determine parameter(s) related to the second reference signal based on the first reference signal. In this way, the positioning accuracy for terminal devices in an inactive state can be improved. Embodiments of the present disclosure are described with the reference to a failed detection of the first reference signal and a successful detection of the second reference signal.

As mentioned above, in some embodiments, the first reference signal can be a path-loss reference signal for a SRS resource set and the second reference signal can be a spatial relation reference signal for a SRS resource. In this case, the first device 110-1 may determine the parameter related to the path-loss reference signal based on the spatial relation reference signal. For example, the first device 110-1 may determine a path-loss based on the spatial relation reference signal. That is, the first device 110-1 performs path-loss measurement by using the spatial relation reference signal. In this case, the first device 110-1 may determine 2040 a transmission power for transmitting the SRS resource to a target neighbor cell based on the path-loss. The transmission power can be determined based on the path-loss using any proper manners. In other words, for a SRS resource, if the first device 110-1 fails to properly detect the path-loss reference signal but the first device 110-1 properly detects the spatial relation reference signal, the first device 110-1 may use one or more of the spatial relation reference signal resources, which are configured for SRS resources within this SRS resource set, as one or more path-loss reference signals for this SRS resource. In an embodiment, the first device 110-1 performs the SRS resource transmission according to the determined transmission power.

As mentioned previously, in some embodiments, there can be one or more TRPs in a physical cell. In this case, in an example embodiment where the path-loss reference signal is a PRS resource configured for a SRS resource set, the first device 110-1 may determine a spatial relation reference signal which is transmitted from a TRP that transmits the path-loss reference signal, among multiple spatial relation reference signals configured for the SRS resource set. The first device 110-1 may use the determined spatial relation reference signal as the path-loss reference signal and determine the parameter related to the path-loss reference signal (for example, the path-loss) based on the determined spatial relation reference signal.

Alternatively, if there is no configured spatial relation reference signal transmitted from the TRP that transmits the path-loss reference signal or if the first device 110-1 fails to detect the configured spatial relation reference signal transmitted from this TRP, the first device 110-1 may determine one spatial relation reference signal transmitted from the physical cell that transmits the path-loss reference signal. During the selection of the spatial relation reference signal, the first device 110-1 may select a spatial relation reference signal that has the best RSRP among the spatial relation reference signals transmitted from the same physical cell. The best RSRP means the maximum RSRP or the maximum RSRP for the first arrival signal path. Alternatively, the selected spatial relation reference signal may have a smallest TOA. In other embodiments, the selected spatial relation reference signal may have a smallest reference signal time difference.

In other embodiments, if there is no configured spatial relation reference signal transmitted from the TRP that transmits the path-loss reference signal or if the first device 110-1 fails to detect the configured spatial relation reference signal transmitted from this TRP, the first device 110-1 may determine a plurality of spatial relation reference signals transmitted from the physical cell which transmits the path-loss reference signal. In this case, the first device 110-1 may determine path-loss estimations of the plurality of spatial relation reference signals. The first device 110-1 may determine a path-loss based on an average value of the path-loss estimations. During the selection procedure, the first device 110-1 may select the plurality of spatial relation reference signals that show the best RSRPs or smallest ToA.

In some example embodiments where the path-loss reference signal is a SSB resource, the first device 110-1 may determine a spatial relation reference signal transmitted from the physical cell which transmits the path-loss reference signal, among a plurality of spatial relation reference signals configured for the SRS resource set. The first device 110-1 may use the spatial relation reference signal as the path-loss reference signal.

As mentioned previously, in some embodiments, the first reference signal can be a spatial relation reference signal for a SRS resource and the second reference signal can be a path-loss reference signal for a SRS resource set. In this case, the first device 110-1 may determine the parameter related to the spatial relation reference signal based on the path-loss reference signal. For example, the first device 110-1 may determine a spatial relation reference signal for a SRS resource based on the path-loss reference signal. In this case, the first device 110-1 may determine 2042 a transmission beam for transmitting the SRS resource to a target neighbor cell based on the spatial relation. The transmission beam can be determined based on the spatial relation using any proper manners. In other words, for a SRS resource, if the first device 110-1 fails to properly detect the spatial relation reference signal but the first device 110-1 properly detects the path-loss reference signal, the first device 110-1 may use one of the path-loss reference signals, which are configured for the SRS resource set, as the spatial relation reference signal configured for SRS resources included in this SRS resource set.

In some embodiments, the configured spatial relation reference signal is a PRS resource transmitted from a specific TRP of a physical cell and there is a configured path-loss reference signal transmitted from this TRP, but the first device 110-1 could fail to detect the spatial relation reference signal while it properly detects a path-loss reference signal. The first device 110-1 may determine a path-loss reference signal transmitted from the same TRP and physical cell. The first device 110-1 may use this path-loss reference signal as spatial relation reference signal for the SRS resource. In this case, the first device 110-1 may determine the transmission beam based on this path-loss reference signal.

Alternatively, if there is no configured path-loss reference signal transmitted from a TRP which transmits the spatial relation reference signal or if the first device 110-1 fails to detect the configured spatial relation reference signal transmitted from this TRP, the first device 110-1 may select the path-loss reference signal from the cell which transmits the spatial relation reference signal. The first device 110-1 may use the path-loss reference signal as the spatial relation reference signal for the SRS resource. Similarly, in this case, the first device 110-1 may determine the transmission beam based on the selected path-loss reference signal. In other embodiments, if the first device 110-1 does not detect the spatial relation reference signal but detects the path-loss reference signal, the first device 110-1 may deactivate the SRS resource. If the first device 110-1 does not have proper beam direction for SRS transmissions, it may be interference signals.

The second device 120 and/or the core network device 130 may configure a fallback behavior for the first device 110-1. In some embodiments, the fallback behavior can be indicated in the configuration of SRS resource. For example, the configuration of SRS resource may indicate that a reference signal from a TRP or a cell which transmits the first reference signal being used as a fallback reference signal. Alternatively, the second device 120 may configure the first device 110-1 with a particular fallback reference signal. For example, the configuration of SRS resource may indicate a fallback reference signal configured for the first reference signal. Only as an example, the first device 110-1 may be configured with a spatial relation reference signal such as PRS #4 with associated fallback reference signal SSB #3. The first device 110-1 then knows that if it fails to detect PRS #4 that is configured as spatial relation reference signal for SRS resource(s), it should use SSB #3 as the spatial relation reference signal for the SRS resource(s). Alternatively, the first device 110-1 may be configured with a path-loss reference signal such as PRS #2 with associated fallback reference signal SSB #1. The first device 110-1 then knows that if it fails to detect PRS #2 that is configured as path-loss reference signal for a SRS resource set it should use SSB #1 as the path-loss reference signal for the SRS resource set.

In other embodiments, if the first device 110-1 fails to properly detect the first reference signal and the second reference signal where they are configured for a SRS resource or a SRS resource set, the first device 110-1 may deactivate 2045 this configured SRS resource or configured SRS resource set. In other words, if the first device 110 deactivates the configured SRS resource, the first device 110 may not transmit the SRS resource. In this case, in some embodiments, the first device 110-1 may continuously monitor the first reference signal and/or the second reference signal. In some embodiments, the first device 110-1 may keep monitoring the first reference signal and/or the second reference signal based on a monitoring period configured for the inactive state of the first device 110-1. In this way, it can reduce power consumption.

In some embodiments, the first device 110-1 may transmit 2050 a first report indicating a deactivation of the SRS resource to the second device 120. Alternatively or in addition, the first device 110-1 may transmit 2055 the first report indicating a deactivation of the SRS resource to the core network device 130. In this way, the first device 110-1 may inform the second device 120 and/or the core network device 130 of which SRS resources and/or SRS resource set are deactivated so that the network does not expect to receive them.

If the first device 110-1 successfully detects either or both of the first and second reference signals, the first device 110-1 may activate the deactivated SRS resource. In this case, the first device 110-1 may transmit a second report indicating an activation of the SRS resource to the core network device 130 and/or the second device 120. In this way, the first device 110-1 may inform the second device 120 and/or the core network device 130 of which SRS resources and/or SRS resource set are activated so that the network can expect to receive them.

In some embodiments, if the first device 110-1 detects the first reference signal or the second reference signal configured for SRS resource(s), a timer may be triggered. In other words, the timer may be triggered if the first device 110-1 detects one of the first reference signal and the second reference signal, but not the other one of said reference signals. The first device 110-1 may deactivate the SRS resource(s) after or upon expiry of the timer. If the first device 110-1 successfully detects both the first and second reference signals, the timer is not applicable. In some embodiments, if the first device 110-1 fails to detect the first reference signal and/or the second reference signal during running time of the timer, the first device 110-1 can deactivate the SRS resource based on expiry of the timer. For example, if the first device 110-1 fails to detect first reference signal, but detects second reference signal, the timer may be triggered. The timer may run, and after or upon its expiry, the first device 110-1 may deactivate the configured SRS resource. However, if during running time of the timer, the first device 110-1 is able to detect at least the first reference signal (i.e., the reference signal that was not detected), the SRS resource may not be deactivated. In another example, SRS resource is not deactivated upon or after expiry of the timer if both reference signals are detected during running time of the timer. In such case, the timer may expire without action(s) by the first device 110-1 or it may be reset, for example. Additionally, after the timer for semi-invalid state is expired, the first device 110-1 may transmit a request for a reconfiguration of SRS resource to the second device 120. The first device 110-1 may keep using the configured SRS resources as long as the first device 110-1 can detect either the first reference signal or the second reference signal that are configured for the SRS resources. In this way, it can improve power consumption efficiency by avoiding unnecessary power consumption of the terminal device. Alternatively or in addition, after the timer for semi-invalid state is expired, the first device 110-1 may transmit a request for downlink based positioning to a location server.

The first device 110-1 may transmit 2057 a SRS to the second device 120. In this case, the second device 120 may obtain 2060 a positioning measurement based on the SRS resource. For example, the second device 120 may obtain at least one of: AoA, related time of arrival (RTOA) or receiving-transmitting time difference. It should be noted that the order of the transmission 2055 of the first report and the transmission 2057 of SRS shown in FIG. 2 is only an example. The second device 120 may transmit 2065 the positioning measurement to the core network device 130. In this case, the core network device 120 can estimate the location of the first device 110-1 based on the positioning measurement.

It should be noted that according to above embodiments of the present disclosure, the mentioned path-loss reference signal and the spatial relation reference signal are the reference signals transmitted from the neighbor cells/TRPs. It is assumed that the configured path-loss reference signal and spatial relation reference signal transmitted from the serving cell are almost always detectable by the first device 110-1.

In some other embodiments, for a configured SRS resource, even if the first device 110-1 can properly detect either or both of the first reference signal and the second reference signal, the first device 110-1 can deactivate the SRS resource. Depending on the distance between the first device 110-1 and the TRP, the required uplink transmission power to compensate the path-loss may be too high, which is infeasible power from the first device 110-1 side. In this case, the first device 110-1 may decide that the SRS transmission may not be listened to by the TRP even if the first device 110-1 uses maximum transmission power, so deactivation of the SRS resource could be a reasonable choice by the first device 110-1.

Figure 3:
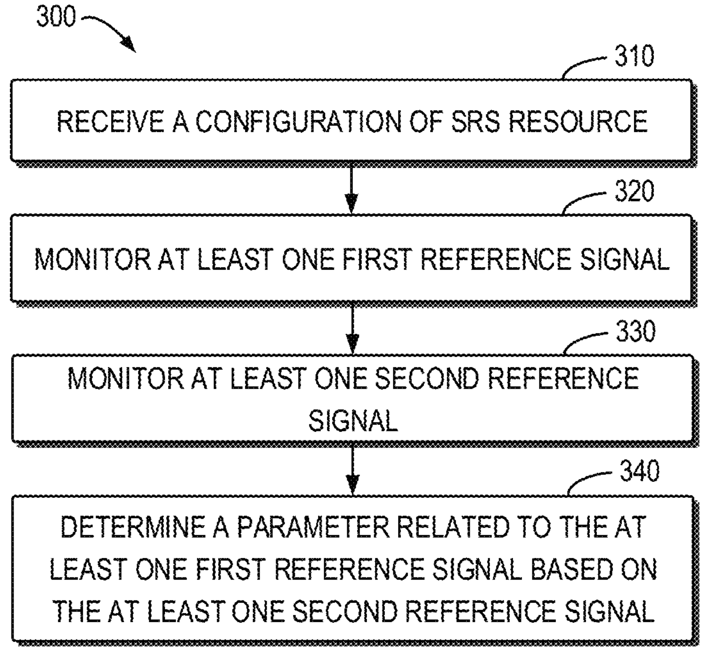
FIG. 3 illustrates a flowchart of a method implemented at a first apparatus according to some example embodiments of the present disclosure.

FIG. 3 shows a flowchart of an example method 300 implemented at a first device 110-1 in accordance with some example embodiments of the present disclosure.

At block 310, the first device 110-1 receives a configuration of SRS resource from the second device 120. In some embodiments, the configuration of SRS resource can be received via RRC signaling. For example, the configuration of SRS resource may be transmitted in RRC Release configuration. In some embodiments, the configuration of SRS resource can comprise a number of physical resource blocks including transmission periodicity which are allocated for the SRS. Alternatively or in addition, the configuration of SRS resource can comprise a bandwidth parameter of SRS. In some embodiments, the configuration of SRS resource may indicate one or more SRS resources. Alternatively or in addition, the configuration of SRS resource may indicate one or more SRS resource sets. The first device 110-1 is to use the configuration of SRS resource for positioning when the first device 110-1 is in an inactive state. In some embodiments, the inactive state can be a RRC_INACTIVE state. Alternatively, the inactive state can be a RRC_INDLE state. It should be noted that the inactive state can refer to any state where the first device 110-1 is not in the RRC_ACTIVE state.

At block 320, the first device 110-1 monitors a first reference signal to the first device 110-1. At block 330, the first device 110-1 monitors the second reference signal. It should be noted that an order of the monitoring of the first reference signal and the monitoring of the second reference signal shown in FIG. 3 is only an example not limitation. In other words, the monitoring of the first reference signal may be before or after the monitoring of the second reference signal. The first reference signal and the second reference signal can be monitored at the same time. In some embodiments, the first device 110-1 may monitor the first and/or second reference signal periodically. Alternatively, the first device 110-1 may keep monitoring the first and/or second reference signal.

In some example embodiments, the first reference signal may be a path-loss reference signal and the second reference signal may be a spatial relation reference signal. Alternatively, the first reference signal may be a spatial relation reference signal and the second reference signal may be a path-loss reference signal. It should be noted that the first reference signal and the second reference signal can be any proper type of downlink reference signals. The term “path-loss reference signal” can refer to a reference signal where the terminal device can determine a transmission power based on path-loss measurement measured from the reference signal. The term “spatial relation reference signal” can refer to a reference signal where the terminal device can determine a transmission beam to transmit SRS resource based on the reference signal.

In an example embodiment, the path-loss reference signal can be a SSB including a physical cell identity, for each SRS resource set. Alternatively, the path-loss reference signal can be a PRS resource including a physical cell identity and a TRP identity, for each SRS resource set.

In other embodiments, the spatial relation reference signal can be a SSB including a physical cell identity, for each SRS resource. Alternatively, the spatial relation reference signal can be a PRS resource including a physical cell identity and a TRP identity, for each SRS resource.

The first device 110-1 may check validity for the first reference signal and the second reference signal. In some embodiments, for a configured SRS resource or a configured SRS resource set, if the first device 110-1 properly detects either the first reference signal or the second reference signal, the first device 110-1 may determine that this configured SRS resource or configured SRS resource set is valid and the first device 110-1 does not deactivate it. In some cases, if the configured SRS resource or SRS resource set was deactivated, the first device 110-1 may activate this configured SRS resource.

At block 340, if the first device 110-1 fails to detect the first reference signal and successfully detect the second reference signal, the first device 110-1 determines a parameter related to the first reference signal based on the second reference signal. Alternatively, if the first device 110-1 successfully detects the first reference signal and fails to detect the second reference signal, the first device 110-1 can determine a parameter related to the second reference signal based on the first reference signal. Embodiments of the present disclosure are described with the reference to a failed detection of the first reference signal and a successful detection of the second reference signal.

As mentioned above, in some embodiments, the first reference signal can be a path-loss reference signal for a SRS resource set and the second reference signal can be a spatial relation reference signal for a SRS resource. In this case, the first device 110-1 may determine the parameter related to the path-loss reference signal based on the spatial relation reference signal. For example, the first device 110-1 may determine a path-loss based on the spatial relation reference signal. That is, the first device 110-1 performs path-loss measurement by using the spatial relation reference signal. The first device 110-1 may determine a transmission power for transmitting the SRS resource to a target neighbor cell based on the path-loss. In other words, for a SRS resource, if the first device 110-1 fails to properly detect the path-loss reference signal but the first device 110-1 properly detects the spatial relation reference signal, the first device 110-1 may use one or more of the spatial relation reference signal resources, which are configured for SRS resources within this SRS resource set, as one or more path-loss reference signals for this SRS resource.

As mentioned previously, in some embodiments, there can be one or more TRPs in a physical cell. In this case, in an example embodiment where the path-loss reference signal is a PRS resource configured for a SRS resource set, the first device 110-1 may determine a spatial relation reference signal which is transmitted from a TRP that transmits the path-loss reference signal, among multiple spatial relation reference signals configured for the SRS resource set. The first device 110-1 may use the determined spatial relation reference signal as the path-loss reference signal and determine the parameter related to the path-loss reference signal (for example, the path-loss) based on the determined spatial relation reference signal.

Alternatively, if there is no configured spatial relation reference signal transmitted from the TRP that transmits the path-loss reference signal or if the first device 110-1 fails to detect the configured spatial relation reference signal transmitted from this TRP, the first device 110-1 may determine one spatial relation reference signal transmitted from the physical cell that transmits the path-loss reference signal. During the selection of the spatial relation reference signal, the first device 110-1 may select a spatial relation reference signal that has the best RSRP among the spatial relation reference signals transmitted from the same physical cell. The best RSRP means the maximum RSRP or the maximum RSRP for the first arrival signal path. Alternatively, the selected spatial relation reference signal may have a smallest TOA. In other embodiments, the selected spatial relation reference signal may have a smallest reference signal time difference.

In other embodiments, if there is no configured spatial relation reference signal transmitted from the TRP that transmits the path-loss reference signal or if the first device 110-1 fails to detect the configured spatial relation reference signal transmitted from this TRP, the first device 110-1 may determine a plurality of spatial relation reference signals transmitted from the physical cell which transmits the path-loss reference signal. In this case, the first device 110-1 may determine path-loss estimations of the plurality of spatial relation reference signals. The first device 110-1 may determine a path-loss based on an average value of the path-loss estimations. During the selection procedure, the first device 110-1 may select the plurality of spatial relation reference signals that show the best RSRPs or smallest ToA.

In some example embodiments where the path-loss reference signal is a SSB resource, the first device 110-1 may determine a spatial relation reference signal transmitted from the physical cell which transmits the path-loss reference signal, among a plurality of spatial relation reference signals configured for the SRS resource set. The first device 110-1 may use the spatial relation reference signal as the path-loss reference signal.

As mentioned previously, in some embodiments, the first reference signal can be a spatial relation reference signal for a SRS resource and the second reference signal can be a path-loss reference signal for a SRS resource set. In this case, the first device 110-1 may determine the parameter related to the spatial relation reference signal based on the path-loss reference signal. For example, the first device 110-1 may determine a spatial relation reference signal for a SRS resource based on the path-loss reference signal. In this case, the first device 110-1 may determine a transmission beam for transmitting the SRS resource to a target neighbor cell based on the spatial relation. In other words, for a SRS resource, if the first device 110-1 fails to properly detect the spatial relation reference signal but the first device 110-1 properly detects the path-loss reference signal, the first device 110-1 may use one of the path-loss reference signals, which are configured for the SRS resource set, as the spatial relation reference signal configured for SRS resources included in this SRS resource set.

In some embodiments, the configured spatial relation reference signal is a PRS resource transmitted from a specific TRP of a physical cell and there is a configured path-loss reference signal transmitted from this TRP, but the first device 110-1 could fail to detect the spatial relation reference signal while it properly detects a path-loss reference signal. The first device 110-1 may determine a path-loss reference signal transmitted from the same TRP and physical cell. The first device 110-1 may use this path-loss reference signal as spatial relation reference signal for the SRS resource. In this case, the first device 110-1 may determine the transmission beam based on this path-loss reference signal.

Alternatively, if there is no configured path-loss reference signal transmitted from a TRP which transmits the spatial relation reference signal or if the UE fails to detect the configured spatial relation reference signal transmitted from this TRP, the first device 110-1 may select the path-loss reference signal from the cell which transmits the spatial relation reference signal. The first device 110-1 may use the path-loss reference signal as the spatial relation reference signal for the SRS resource. Similarly, in this case, the first device 110-1 may determine the transmission beam based on the selected path-loss reference signal. In other embodiments, if the first device 110-1 does not detect the spatial relation reference signal but detects the path-loss reference signal, the first device 110-1 may deactivate the SRS resource. If the first device 110-1 does not have proper beam direction for SRS transmissions, it may be interference signals.

The second device 120 and/or the core network device 130 may configure a fallback behavior for the first device 110-1. In some embodiments, the fallback behavior can be indicated in the configuration of SRS resource. For example, the configuration of SRS resource may indicate that a reference signal from a TRP or a cell which transmits the first reference signal being used as a fallback reference signal. Alternatively, the second device 120 may configure the first device 110-1 with a particular fallback reference signal. For example, the configuration of SRS resource may indicate a fallback reference signal configured for the first reference signal. Only as an example, the first device 110-1 may be configured with a spatial relation reference signal such as PRS #4 with associated fallback reference signal SSB #3. The first device 110-1 then knows that if it fails to detect PRS #4 that is configured as spatial relation reference signal for SRS resource(s), it should use SSB #3 as the spatial relation reference signal for the SRS resource(s). Alternatively, the first device 110-1 may be configured with a path-loss reference signal such as PRS #2 with associated fallback reference signal SSB #1. The first device 110-1 then knows that if it fails to detect PRS #2 that is configured as path-loss reference signal for a SRS resource set it should use SSB #1 as the path-loss reference signal for the SRS resource set.

In other embodiments, if the first device 110-1 fails to properly detect the first reference signal and the second reference signal where they are configured for a SRS resource or a SRS resource set, the first device 110-1 may deactivate this configured SRS resource or configured SRS resource set. In other words, if the first device 110 deactivates the configured SRS resource, the first device 110 may not transmit the SRS resource. In this case, in some embodiments, the first device 110-1 may continuously monitor the first reference signal and the second reference signal. In some embodiments, the first device 110-1 may keep monitoring the first reference signal and the second reference signal based on a monitoring period configured for the inactive state of the first device 110-1. In this way, it can reduce power consumption.

In some embodiments, the first device 110-1 may transmit a first report indicating a deactivation of the SRS resource to the second device 120. Alternatively or in addition, the first device 110-1 may transmit the first report indicating a deactivation of the SRS resource to the core network device 130. In this way, the first device 110-1 may inform the second device 120 and/or the core network device 130 of which SRS resources and/or SRS resource set are deactivated so that the network does not expect to receive them.

If the first device 110-1 successfully detects either or both of the first and second reference signals, the first device 110-1 may activate the deactivated SRS resource. In this case, the first device 110-1 may transmit a second report indicating an activation of the SRS resource to the core network device 130 and/or the second device 120. In this way, the first device 110-1 may inform the second device 120 and/or the core network device 130 of which SRS resources and/or SRS resource set are activated so that the network can expect to receive them.

In some embodiments, if the first device 110-1 only detects the first reference signal or the second reference signal configured for SRS resource(s), a timer may be triggered. The first device may deactivate the SRS resource(s) after the timer is expired. If the first device 110-1 successfully detects both the first and second reference signals, the timer is not applicable. In some embodiments, if the first device 110-1 fails to detect the first reference signal or the second reference signal during running time of the timer, the first device 110-1 can deactivate the SRS resource based on expiry of the timer. Additionally, after the timer for semi-invalid state is expired, the first device 110-1 may transmit a request for a reconfiguration of SRS resource to the second device 120. The first device 110-1 may keep using the configured SRS resources as long as the first device 110-1 can detect either the first reference signal or the second reference signal that are configured for the SRS resources.

The first device 110-1 may transmit SRS resource to the second device. It should be noted that according to above embodiments of the present disclosure, the mentioned path-loss reference signal and the spatial relation reference signal are the reference signals transmitted from the neighbor cells/TRPs. It is assumed that the configured path-loss reference signal and spatial relation reference signal transmitted from the serving cell are almost always detectable by the first device 110-1.

In some other embodiments, for a configured SRS resource, even if the first device 110-1 can properly detect either or both of the first reference signal and the second reference signal, the first device 110-1 can deactivate the SRS resource. Depending on the distance between the first device 110-1 and the TRP, the required uplink transmission power to compensate the path-loss may be too high, which is infeasible power from the first device 110-1 side. In this case, the first device 110-1 may decide that the SRS transmission may not be listened to by the TRP even if the first device 110-1 uses maximum transmission power, so deactivation of the SRS resource could be a reasonable choice by the first device 110-1.

Figure 4:
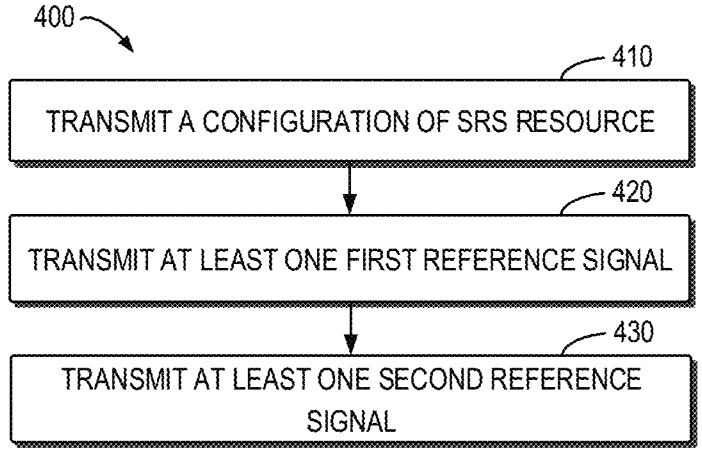
FIG. 4 illustrates a flowchart of a method implemented at a second apparatus according to some example embodiments of the present disclosure.

FIG. 4 shows a flowchart of an example method 400 implemented at a second device 120 in accordance with some other example embodiments of the present disclosure.

At block 410, the second device 120 transmits a configuration of SRS resource. In some embodiments, the configuration of SRS resource can be transmitted via RRC signaling. For example, the configuration of SRS resource may be transmitted in RRC Release configuration. In some embodiments, the configuration of SRS resource can comprise a number of physical resource blocks and transmission periodicity which are allocated for the SRS. Alternatively or in addition, the configuration of SRS resource can comprise a bandwidth parameter of SRS. In some embodiments, the configuration of SRS resource may indicate one or more SRS resources. Alternatively or in addition, the configuration of SRS resource may indicate one or more SRS resource sets. The first device 110-1 is to use the configuration of SRS resource for positioning when the first device 110-1 is in an inactive state. In some embodiments, the inactive state can be a RRC_INACTIVE state. Alternatively, the inactive state can be a RRC_INDLE state. It should be noted that the inactive state can refer to any state where the first device 110-1 is not in the RRC_ACTIVE state.

At block 420, the second device 120 transmits a first reference signal to the first device 110-1. At block 430, the second device 120 transmits a second reference signal to the first device 110-1. It should be noted that an order of the transmission of the first reference signal and the transmission of the second reference signal shown in FIG. 2 is only an example not limitation. In other words, the transmission of the first reference signal may be before or after the transmission of the second reference signal. In some embodiments, the first device 110-1 may monitor the first and/or second reference signal periodically. Alternatively, the first device 110-1 may keep monitoring the first and/or second reference signal.

In some example embodiments, the first reference signal may be a path-loss reference signal and the second reference signal may be a spatial relation reference signal. Alternatively, the first reference signal may be a spatial relation reference signal and the second reference signal may be a path-loss reference signal. It should be noted that the first reference signal and the second reference signal can be any proper type of reference signals. The term "path-loss reference signal" can refer to a reference signal where the terminal device can determine a transmission power based on the reference signal. The term "spatial relation reference signal" can refer to a reference signal where the terminal device can determine a transmission beam to transmit SRS resource based on the reference signal.

In an example embodiment, the path-loss reference signal can be a SSB including a physical cell identity, for each SRS resource set. Alternatively, the path-loss reference signal can be a PRS resource including a physical cell identity and a transmission reception point (TRP) identity, for each SRS resource set.

In other embodiments, the spatial relation reference signal can be a SSB including a physical cell identity, for each SRS resource. Alternatively, the spatial relation reference signal can be a PRS resource including a physical cell identity and a TRP identity, for each SRS resource.

The second device 120 and/or the core network device 130 may configure a fallback behavior for the first device 110-1. In some embodiments, the fallback behavior can be indicated in the configuration of SRS resource. For example, the configuration of SRS resource may indicate that a reference signal from a TRP or a cell which transmits the first reference signal being used as a fallback reference signal. Alternatively, the second device 120 may configure the first device 110-1 with a particular fallback reference signal. For example, the configuration of SRS resource may indicate a fallback reference signal configured for the first reference signal. Only as an example, the first device 110-1 may be configured with a spatial relation reference signal such as PRS #4 with associated fallback reference signal SSB #3. The first device 110-1 then knows that if it fails to detect PRS #4 which is configured as the spatial relation reference signal for a SRS resource it should use SSB #3 as the spatial relation reference signal for the SRS resource. Alternatively, the first device 110-1 may be configured with a path-loss reference signal such as PRS #2 with associated fallback reference signal SSB #1. The first device 110-1 then knows that if it fails to detect PRS #2 which is configured for a SRS resource set it should use SSB #1 as the path-loss reference signal for the SRS resource set.

In some embodiments, the second device 120 may receive a first report indicating a deactivation of the SRS resource from the first device 110-1. In this way, the first device 110-1 may inform the second device 120 and/or the core network device 130 of which SRS resources and/or SRS resource set are deactivated so that the network does not expect to receive them.

If the first device 110-1 successfully detects either or both of the first and second reference signals, the first device 110-1 may activate the deactivated SRS resource. In this case, the second device 120 may receive a second report indicating an activation of the SRS resource from the first device 110-1. In this way, the first device 110-1 may inform the second device 120 and/or the core network device 130 of which SRS resources and/or SRS resource set are activated so that the network can expect to receive them.

The second device 120 may receive SRS resource from the first device 110-1. In this case, the second device 120 may obtain a positioning measurement based on the SRS resource. For example, the second device 120 may obtain at least one of: AoA, related time of arrival (RTOA) or receiving-transmitting time difference. The second device 120 may transmit the positioning measurement to the core network device 130. In this case, the core network device 120 can estimate the location of the first device 110-1 based on the positioning measurement.

In some example embodiments, a first apparatus capable of performing any of the method 300 (for example, the first device 110) may comprise means for performing the respective operations of the method 300. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some embodiments, the apparatus comprises means for receiving, from a second device, a configuration of sounding reference signal (SRS) resource for positioning to be used in an inactive state of the first device; means for monitoring at least one first reference signal associated with the configuration of SRS resource from the second device; means for monitoring at least one second reference signal associated with the configuration of the SRS resource from the second device; and means for in accordance with a determination of a failure in detecting the at least one first reference signal and a success in detecting the at least one second reference signal, determining a parameter related to the at least one first reference signal based on the at least one second reference signal.

In some embodiments, the at least one first reference signal is a path-loss reference signal for a SRS resource set and the at least one second reference signal is a spatial relation reference signal for a SRS resource.

In some embodiments, the path-loss reference signal is a positioning reference signal (PRS) resource, and the apparatus further comprises means for determining, among a plurality of spatial relation reference signals for the SRS resource set, the spatial relation reference signal from a transmission reception point (TRP) which transmits the path-loss reference signal; and the means for determining the parameter related to the at least one first reference signal based on the at least one second reference signal comprises: means for determining a path-loss for the SRS resource based on the spatial relation reference signal.

In some embodiments, the path-loss reference signal is a PRS resource, and the apparatus further comprises means for in accordance with a determination that no configured spatial relation reference signal is from a TRP which transmits the path-loss reference signal, determining, among a plurality of spatial relation reference signals transmitted from a physical cell which transmits the path-loss reference signal for the SRS resource set, the spatial relation reference signal; and means for determining the parameter related to the at least one first reference signal based on the at least one second reference signal comprises: means for determining a path-loss for the SRS resource based on the spatial relation reference signal.

In some embodiments, the spatial relation reference signal has one of: a maximum received power, a smallest reference signal time difference, or a smallest time of arrival, among the plurality of spatial relation reference signals configured for the SRS resource set.

In some embodiments, the path-loss reference signal is a PRS resource, and the apparatus further comprises means for in accordance with a determination that no spatial relation reference signal is from a TRP which transmits the path-loss reference signal, determining a plurality of spatial relation reference signals from a cell which transmits the path-loss reference signal; and the means for determining the parameter related to the at least one first reference signal based on the at least one second reference signal comprises: means for determining path-loss estimations of the plurality of spatial relation reference signals; and means for determining a path-loss based on an average value of the path-loss estimations.

In some embodiments, the plurality of spatial relation reference signals have at least one of: maximum received powers, smallest reference signal time difference, or smallest time of arrival.

In some embodiments, the path-loss reference signal is a synchronization signal/physical broadcast block (SSB) resource, and the apparatus further comprises means for determining, among a plurality of spatial relation reference signals for the SRS resource set, the spatial relation reference signal from a cell which transmits the path-loss reference signal; and the means for determining the parameter related to the at least one first reference signal based on the at least one second reference signal comprises: means for determining a path-loss based on the spatial relation reference signal.

In some embodiments, the apparatus further comprises means for determining a transmission power for the SRS resource based on the path-loss.

In some embodiments, the at least one first reference signal is a spatial relation reference signal for a SRS resource and the at least one second reference signal is a path-loss reference signal for a SRS resource set.

In some embodiments, the spatial relation reference signal is a PRS resource, and the apparatus further comprises means for determining, among a plurality of path-loss signals, the path-loss reference signal from a TRP which transmits the spatial relation reference signal; and the means for determining the parameter related to the at least one first reference signal based on the at least one second reference signal comprises: means for determining a spatial relation based on the path-loss reference signal.

In some embodiments, the spatial relation reference signal is a PRS, and the apparatus further comprises means for in accordance with a determination that no configured path-loss reference signal is from a TRP which transmits the spatial relation reference signal, determining the path-loss reference signal from a cell which transmits the spatial relation reference signal; and the means for determining the parameter related to the at least one first reference signal based on the at least one second reference signal comprises: means for determining a spatial relation based on the path-loss reference signal.

In some embodiments, the spatial relation reference signal is a PRS, and the apparatus further comprises means for deactivating the SRS resource.

In some embodiments, the apparatus further comprises means for in accordance with a determination of a failure in detecting the first reference signal and the second reference signal, deactivating the SRS resource; and means for continuously monitoring the at least one first reference signal and the at least one second reference signal from the second device.

In some embodiments, the means for continuously monitoring the at least one first reference signal and the at least one second reference signal comprises: means for continuously monitoring the at least one first reference signal and the at least one second reference signal based on a monitoring period configured for the RRC inactive state of the first device.

In some embodiments, the apparatus further comprises means for transmitting, to the second device or a core network device, a first report indicating a deactivation of the SRS resource.

In some embodiments, the apparatus further comprises means for in accordance with a determination of a success in detecting at least one of: the at least one first reference signal and the at least one second reference signal, activating the SRS resource.

In some embodiments, the apparatus further comprises means for transmitting, to the second device or a core network device, a second report indicating an activation of the SRS resource.

In some embodiments, the configuration of SRS resource indicates one of: a reference signal from a TRP or cell which transmits the at least one first reference signal being used as a fallback reference signal, or a fallback reference signal configured for the at least one first reference signal.

In some embodiments, the apparatus further comprises means for in accordance with a determination of the failure in detecting the at least one first reference signal and the success in detecting the at least one second reference signal, triggering a timer; and in accordance with a determination that there is a failure in detecting the first reference signal or the second reference signal while the timer is running, deactivating the SRS resource based on expiry of the timer.

In some embodiments, the apparatus further comprises at least one of: means for in accordance with a determination of an expiration of a timer, transmitting, to the second device, a request for a reconfiguration of SRS resource; or means for in accordance with a determination of the expiration of the timer, transmitting, to a location server, a request for downlink based positioning.

In some embodiments, the inactive state is a radio resource control (RRC) inactive state, or the inactive state is a RRC idle state.

Figure 5:
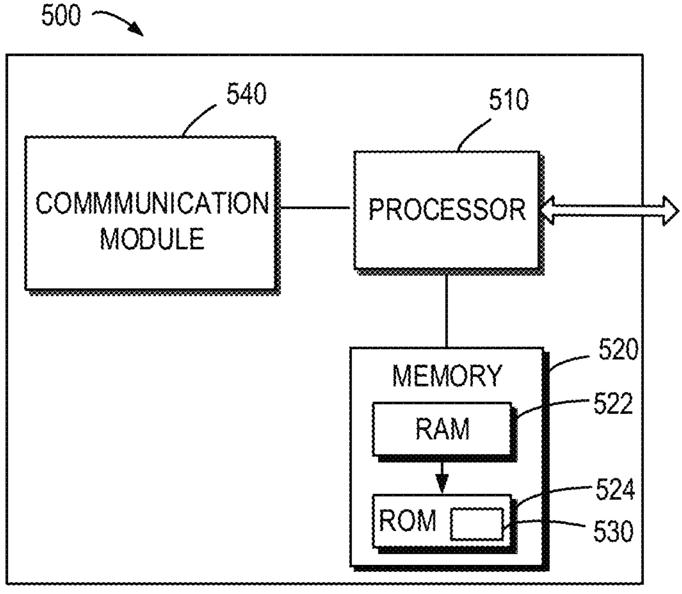
FIG. 5 illustrates a simplified block diagram of an apparatus that is suitable for implementing example embodiments of the present disclosure.

FIG. 5 is a simplified block diagram of a device 500 that is suitable for implementing example embodiments of the present disclosure. The device 500 may be provided to implement a communication device, for example, the first device 110 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has one or more communication interfaces to facilitate communication with one or more other modules or devices. The communication interfaces may represent any interface that is necessary for communication with other network elements. In some example embodiments, the communication module 540 may include at least one antenna.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the memory, e.g., ROM 524. The processor 510 may perform any suitable actions and processing by loading the program 530 into the RAM 522.

Some example embodiments of the present disclosure may be implemented by means of the program 530 so that the device 600 may perform any process of the disclosure as discussed with reference to FIGS. 2 to 4. The example embodiments of the present disclosure may also be implemented by hardware or by a combination of software and hardware.

Figure 6:
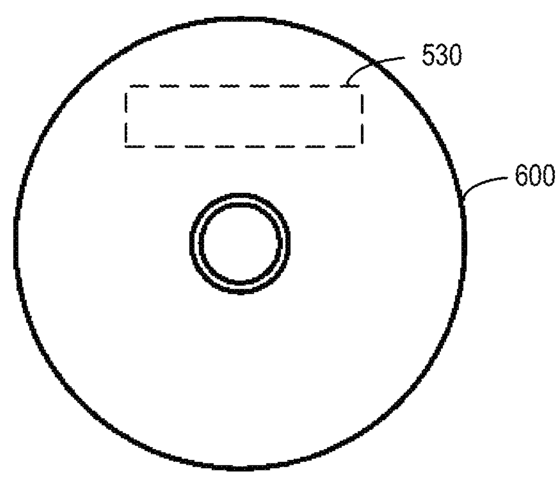
FIG. 6 illustrates a block diagram of an example computer readable medium in accordance with some example embodiments of the present disclosure.

In some example embodiments, the program 530 may be tangibly contained in a computer readable medium which may be included in the device 600 (such as in the memory 520) or other storage devices that are accessible by the device 600. The device 600 may load the program 530 from the computer readable medium to the RAM 522 for execution. The computer readable medium may include any types of tangible non-volatile storage, such as ROM, EPROM, a flash memory, a hard disk, CD, DVD, and other magnetic storage and/or optical storage. FIG. 6 shows an example of the computer readable medium 600 in form of an optical storage disk. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

a processor; and a non-transitory computer-readable medium comprising computer-executable instructions that, when executed by the processor, cause the processor to perform the following operations:

receive, from a second device, a configuration of sounding reference signal (SRS) resource for positioning to be used in an inactive state of the first device;

monitor at least one first reference signal associated with the configuration of SRS resource from the second device and at least one second reference signal associated with the configuration of the SRS resource from the second device, wherein the at least one first reference signal is a path-loss reference signal for a SRS resource set and the at least one second reference signal is a spatial relation reference signal for a SRS resource, wherein the path-loss reference signal is a positioning reference signal (PRS) resource, and wherein the spatial relation reference signal has a maximum received power, a smallest reference signal time difference, and a smallest time of arrival, among a plurality of spatial relation reference signals configured for the SRS resource set;

determine that no configured spatial relation reference signal is from a TRP which transmits the path-loss reference signal;

based on a determination that no configured spatial relation reference signal is from a TRP which transmits the path-loss reference signal, determine, among a plurality of spatial relation reference signals transmitted from a physical cell which transmits the path-loss reference signal for the SRS resource set, the spatial relation reference signal;

determine the parameter related to the at least one first reference signal based on the at least one second reference signal by:

determining path-loss estimations of the plurality of spatial relation reference signals; and determining a path-loss based on an average value of the path-loss estimations;

determine a failure in detecting the at least one first reference signal and a success in detecting the at least one second reference signal;

based on the determination of the failure in detecting the at least one first reference signal and the success in detecting the at least one second reference signal:

trigger a timer;

continuously monitor the at least one first reference signal and the at least one second reference signal from the second device based on a monitoring period configured for an radio resource control (RRC) inactive state of the first device; and deactivate the SRS resource based on expiry of the timer.

2. The first device of claim 1, wherein the computer-executable instructions further cause the processor to perform the following operation:

determine a transmission power for the SRS resource based on the path-loss.

3. The first device of claim 2, wherein the computer-executable instructions further cause the processor to perform the following operation:

transmit, to the second device or a core network device, a first report indicating a deactivation of the SRS resource; and transmit, to the second device or a core network device, a second report indicating an activation of the SRS resource.

4. The first device of claim 3, wherein the configuration of SRS resource indicates a reference signal from a TRP or cell which transmits the at least one first reference signal being used as a fallback reference signal.

5. The first device of claim 3, wherein the configuration of SRS resource indicates a fallback reference signal configured for the at least one first reference signal.

6. The first device of claim 5, wherein the computer-executable instructions further cause the processor to perform the following operation:

in accordance with a determination of an expiration of a timer, transmit, to the second device, a request for a reconfiguration of SRS resource; or in accordance with a determination of the expiration of the timer, transmit, to a location server, a request for downlink based positioning.

7. The first device of claim 6, wherein the first device is a terminal device and the second device is a network device.

8. A system comprising:

a first device;

a processor; and a non-transitory computer-readable medium comprising computer-executable instructions that, when executed by the processor, cause the processor to perform the following operations:

receive, from a second device, a configuration of sounding reference signal (SRS) resource for positioning to be used in an inactive state of the first device;

monitor at least one first reference signal associated with the configuration of SRS resource from the second device and at least one second reference signal associated with the configuration of the SRS resource from the second device, wherein the at least one first reference signal is a path-loss reference signal for a SRS resource set and the at least one second reference signal is a spatial relation reference signal for a SRS resource, wherein the path-loss reference signal is a positioning reference signal (PRS) resource, and wherein the spatial relation reference signal has a maximum received power, a smallest reference signal time difference, and a smallest time of arrival, among a plurality of spatial relation reference signals configured for the SRS resource set;

determine that no configured spatial relation reference signal is from a TRP which transmits the path-loss reference signal;

based on a determination that no configured spatial relation reference signal is from a TRP which transmits the path-loss reference signal, determine, among a plurality of spatial relation reference signals transmitted from a physical cell which transmits the path-loss reference signal for the SRS resource set, the spatial relation reference signal;

determine the parameter related to the at least one first reference signal based on the at least one second reference signal by:

determining path-loss estimations of the plurality of spatial relation reference signals; and determining a path-loss based on an average value of the path-loss estimations;

determine a failure in detecting the at least one first reference signal and a success in detecting the at least one second reference signal;

based on the determination of the failure in detecting the at least one first reference signal and the success in detecting the at least one second reference signal:

trigger a timer;

continuously monitor the at least one first reference signal and the at least one second reference signal from the second device based on a monitoring period configured for an radio resource control (RRC) inactive state of the first device; and deactivate the SRS resource based on expiry of the timer.

9. The system of claim 8, wherein the computer-executable instructions further cause the processor to perform the following operation:

determine a transmission power for the SRS resource based on the path-loss.

10. The system of claim 9, wherein the computer-executable instructions further cause the processor to perform the following operation:

transmit, to the second device or a core network device, a first report indicating a deactivation of the SRS resource; and transmit, to the second device or a core network device, a second report indicating an activation of the SRS resource.

11. The system of claim 10, wherein the configuration of SRS resource indicates a reference signal from a TRP or cell which transmits the at least one first reference signal being used as a fallback reference signal.

12. The system of claim 10, wherein the configuration of SRS resource indicates a fallback reference signal configured for the at least one first reference signal.

13. The system of claim 12, wherein the computer-executable instructions further cause the processor to perform the following operation:

in accordance with a determination of an expiration of a timer, transmit, to the second device, a request for a reconfiguration of SRS resource; or in accordance with a determination of the expiration of the timer, transmit, to a location server, a request for downlink based positioning.

14. The system of claim 13, wherein the first device is a terminal device and the second device is a network device.

15. A method comprising:

receiving, from a second device, a configuration of sounding reference signal (SRS) resource for positioning to be used in an inactive state of the first device;

monitoring at least one first reference signal associated with the configuration of SRS resource from the second device and at least one second reference signal associated with the configuration of the SRS resource from the second device, wherein the at least one first reference signal is a path-loss reference signal for a SRS resource set and the at least one second reference signal is a spatial relation reference signal for a SRS resource, wherein the path-loss reference signal is a positioning reference signal (PRS) resource, and wherein the spatial relation reference signal has a maximum received power, a smallest reference signal time difference, and a smallest time of arrival, among a plurality of spatial relation reference signals configured for the SRS resource set;

determining that no configured spatial relation reference signal is from a TRP which transmits the path-loss reference signal;

based on a determination that no configured spatial relation reference signal is from a TRP which transmits the path-loss reference signal, determining, among a plurality of spatial relation reference signals transmitted from a physical cell which transmits the path-loss reference signal for the SRS resource set, the spatial relation reference signal;

determining the parameter related to the at least one first reference signal based on the at least one second reference signal by:

determining path-loss estimations of the plurality of spatial relation reference signals; and determining a path-loss based on an average value of the path-loss estimations;

determining a failure in detecting the at least one first reference signal and a success in detecting the at least one second reference signal;

based on the determination of the failure in detecting the at least one first reference signal and the success in detecting the at least one second reference signal:

triggering a timer;

continuously monitoring the at least one first reference signal and the at least one second reference signal from the second device based on a monitoring period configured for an radio resource control (RRC) inactive state of the first device; and deactivating the SRS resource based on expiry of the timer.

16. The system of claim 15, further comprising determining a transmission power for the SRS resource based on the path-loss.

17. The system of claim 16, further comprising:

transmitting, to the second device or a core network device, a first report indicating a deactivation of the SRS resource; and transmitting, to the second device or a core network device, a second report indicating an activation of the SRS resource.

18. The system of claim 17, wherein the configuration of SRS resource indicates a reference signal from a TRP or cell which transmits the at least one first reference signal being used as a fallback reference signal.

19. The system of claim 17, wherein the configuration of SRS resource indicates a fallback reference signal configured for the at least one first reference signal.

20. The system of claim 19, further comprising:

in accordance with a determination of an expiration of a timer, transmitting, to the second device, a request for a reconfiguration of SRS resource; or in accordance with a determination of the expiration of the timer, transmitting, to a location server, a request for downlink based positioning.

* * * * *